United States Patent
Brisebois et al.

(10) Patent No.: US 10,306,454 B2
(45) Date of Patent: *May 28, 2019

(54) USER EQUIPMENT DETECTION OF INTERFERENCE-SENSITIVE DEVICES

(71) Applicants: AT&T Mobility II LLC, Atlanta, GA (US); AT&T Intellectual Property I, L.P., Atlanta, GA (US)

(72) Inventors: Arthur Richard Brisebois, Cumming, GA (US); Zhi Cui, Sugar Hill, GA (US)

(73) Assignees: AT&T Mobility II LLC, Atlanta, GA (US); AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/898,898

(22) Filed: Feb. 19, 2018

(65) Prior Publication Data

US 2018/0176761 A1 Jun. 21, 2018

Related U.S. Application Data

(63) Continuation of application No. 14/724,201, filed on May 28, 2015, now Pat. No. 9,900,762.

(51) Int. Cl.
*H04B 15/02* (2006.01)
*H04B 17/345* (2015.01)
(Continued)

(52) U.S. Cl.
CPC .............. *H04W 8/005* (2013.01); *H04B 5/00* (2013.01); *H04B 5/0031* (2013.01); *H04B 5/0056* (2013.01); *H04W 4/80* (2018.02)

(58) Field of Classification Search
CPC combination set(s) only.
See application file for complete search history.

(56) References Cited

U.S. PATENT DOCUMENTS

| | | |
|---|---|---|
| 6,314,308 B1 | 11/2001 | Sheynblat et al. |
| 6,430,168 B1 | 8/2002 | Djurkovic et al. |

(Continued)

FOREIGN PATENT DOCUMENTS

| | | |
|---|---|---|
| EP | 2244503 | 10/2010 |
| EP | 2197228 | 12/2011 |

(Continued)

OTHER PUBLICATIONS

U.S. Office Action dated Jun. 27, 2012 in U.S. Appl. No. 12/946,611.

(Continued)

*Primary Examiner* — Andrew Wendell
(74) *Attorney, Agent, or Firm* — Hartman & Citrin LLC

(57) ABSTRACT

Concepts and technologies are described herein for user equipment ("UE") detection of interference-sensitive devices. According to one aspect disclosed herein, a mobile initiator device can utilize a near-field communications ("NFC") hardware component to generate a radio frequency ("RF") field that is used to activate a passive NFC component associated with an interference-sensitive device. The mobile initiator device can utilize the NFC hardware component to receive information about an interference sensitivity of the interference-sensitive device. The mobile initiator device can adjust one or more operational aspects of the mobile initiator device to accommodate the interference sensitivity information of the interference-sensitive device.

20 Claims, 6 Drawing Sheets

(51) Int. Cl.
*H04W 40/16* (2009.01)
*H04W 8/00* (2009.01)
*H04B 5/00* (2006.01)
*H04W 4/80* (2018.01)

(56) References Cited

U.S. PATENT DOCUMENTS

| | | |
|---|---|---|
| 7,082,305 B2 | 7/2006 | Willars et al. |
| 7,116,970 B2 | 10/2006 | Brusilovsky et al. |
| 7,146,130 B2 | 12/2006 | Hsu et al. |
| 7,400,600 B2 | 7/2008 | Mullany et al. |
| 7,400,886 B2 | 7/2008 | Sahim et al. |
| 7,440,755 B2 | 10/2008 | Balachandran |
| 7,496,060 B2 | 2/2009 | Ramirez et al. |
| 7,508,781 B2 | 3/2009 | Liu et al. |
| 7,590,422 B1 | 9/2009 | Chow et al. |
| 7,653,392 B2 | 1/2010 | Ovadia et al. |
| 7,680,469 B2 | 3/2010 | Fry |
| 7,924,787 B2 | 4/2011 | Lee |
| 7,929,964 B2 | 4/2011 | Arumi et al. |
| 7,936,708 B2 | 5/2011 | Kesavan et al. |
| 8,121,090 B1 | 2/2012 | Dinan et al. |
| 8,121,607 B2 | 2/2012 | Fang et al. |
| 8,126,461 B2 | 2/2012 | Sengupta et al. |
| 8,140,010 B2 | 3/2012 | Symons |
| 8,212,661 B2 | 7/2012 | Shuster |
| 8,254,982 B2 | 8/2012 | Kuningas |
| 8,270,975 B2 | 9/2012 | Kim et al. |
| 8,270,991 B2 | 9/2012 | Zhao |
| 8,271,025 B2 | 9/2012 | Brisebois et al. |
| 8,279,831 B2 | 10/2012 | Sengupta et al. |
| 8,280,377 B2 | 10/2012 | Lee et al. |
| 8,331,228 B2 | 12/2012 | Huber et al. |
| 8,331,929 B2 | 12/2012 | Brisebois et al. |
| 8,364,156 B2 | 1/2013 | Chun et al. |
| 8,385,917 B2 | 2/2013 | Brisebois |
| 8,391,238 B2 | 3/2013 | Rune et al. |
| 8,417,823 B2 | 4/2013 | Luna et al. |
| 8,467,786 B2 | 6/2013 | Salkintzis |
| 8,487,516 B2 | 7/2013 | Brisebois et al. |
| 8,488,586 B2 | 7/2013 | Centonza et al. |
| 8,489,020 B2 | 7/2013 | Bangs |
| 8,493,935 B2 | 7/2013 | Zisimopoulous |
| 8,510,801 B2 | 8/2013 | Majmundar et al. |
| 8,522,312 B2 | 8/2013 | Huber et al. |
| 8,611,324 B2 | 12/2013 | Chhabra |
| 8,693,949 B2 | 4/2014 | Royston |
| 8,724,599 B2 | 5/2014 | Kim |
| 8,787,830 B2 | 7/2014 | Moosavi et al. |
| 8,803,474 B2 | 8/2014 | Hillan et al. |
| 8,831,509 B2 | 9/2014 | Moosavi et al. |
| 8,897,699 B2 | 11/2014 | Wilson et al. |
| 8,909,144 B2 | 12/2014 | Huomo |
| 8,913,961 B2 | 12/2014 | Prather et al. |
| 8,965,279 B2 | 2/2015 | Lefley |
| 8,971,800 B2 | 3/2015 | Hillan et al. |
| 9,071,480 B2 | 6/2015 | Chen |
| 9,100,891 B2 | 8/2015 | Zheng |
| 9,197,059 B2 | 11/2015 | Wilson |
| 9,241,305 B2 | 1/2016 | Cui et al. |
| 9,635,494 B2 | 4/2017 | Brisebois et al. |
| 9,900,762 B2 * | 2/2018 | Brisebois ............. H04W 8/005 |
| 2002/0123365 A1 | 9/2002 | Thorson et al. |
| 2003/0078075 A1 | 4/2003 | Mcnicol |
| 2003/0117953 A1 | 6/2003 | Kinahan et al. |
| 2007/0091847 A1 | 4/2007 | Lee |
| 2007/0184835 A1 | 8/2007 | Bitran et al. |
| 2007/0293232 A1 | 12/2007 | Nonaka |
| 2009/0068970 A1 | 3/2009 | Ahmed et al. |
| 2009/0088131 A1 | 4/2009 | Gholmieh et al. |
| 2009/0088160 A1 | 4/2009 | Pani et al. |
| 2009/0154423 A1 | 6/2009 | Song et al. |
| 2009/0164813 A1 | 6/2009 | Tu et al. |
| 2009/0209263 A1 | 8/2009 | Breuer et al. |
| 2009/0221240 A1 | 9/2009 | Zhang |
| 2009/0252137 A1 | 10/2009 | Bitran et al. |
| 2010/0056181 A1 | 3/2010 | Rippon et al. |
| 2010/0085947 A1 | 4/2010 | Ringland et al. |
| 2010/0149971 A1 | 6/2010 | Noriega |
| 2010/0178866 A1 | 7/2010 | Jalkanen |
| 2010/0195632 A1 | 8/2010 | Prabhu |
| 2010/0234021 A1 | 9/2010 | Ngai et al. |
| 2010/0255849 A1 | 10/2010 | Ore |
| 2010/0279601 A1 | 11/2010 | Phan et al. |
| 2010/0296415 A1 | 11/2010 | Sachs et al. |
| 2010/0296474 A1 | 11/2010 | Noriega |
| 2011/0059694 A1 | 3/2011 | Audic |
| 2011/0070863 A1 | 3/2011 | Ma et al. |
| 2011/0072101 A1 | 3/2011 | Forssell et al. |
| 2011/0075557 A1 | 3/2011 | Chowdhury et al. |
| 2011/0142006 A1 | 6/2011 | Sachs |
| 2011/0149879 A1 | 6/2011 | Noriega et al. |
| 2011/0235615 A1 | 9/2011 | Kalhan |
| 2011/0254687 A1 | 10/2011 | Arponen |
| 2011/0261695 A1 | 10/2011 | Zhao et al. |
| 2011/0291834 A1 | 12/2011 | Boldyrev |
| 2011/0306386 A1 | 12/2011 | Centoza et al. |
| 2011/0319084 A1 | 12/2011 | Meshkati |
| 2012/0013504 A1 | 1/2012 | Raento et al. |
| 2012/0021725 A1 | 1/2012 | Rune |
| 2012/0040608 A1 | 2/2012 | Walker et al. |
| 2012/0045989 A1 | 2/2012 | Suumaki et al. |
| 2012/0057493 A1 | 3/2012 | Omori |
| 2012/0108252 A1 | 5/2012 | Dimou et al. |
| 2012/0122396 A1 | 5/2012 | Ha |
| 2012/0188992 A1 | 7/2012 | Kim et al. |
| 2012/0258674 A1 | 10/2012 | Livet et al. |
| 2012/0258715 A1 | 10/2012 | Souissi et al. |
| 2012/0264412 A1 | 10/2012 | Tervonen et al. |
| 2012/0275371 A1 | 11/2012 | Somasundaram et al. |
| 2012/0294293 A1 | 11/2012 | Kahn et al. |
| 2012/0315905 A1 | 12/2012 | Zhu et al. |
| 2012/0324100 A1 | 12/2012 | Tomici et al. |
| 2013/0012182 A1 | 1/2013 | Liao |
| 2013/0023302 A1 | 1/2013 | Sivanesan et al. |
| 2013/0029708 A1 | 1/2013 | Fox et al. |
| 2013/0045740 A1 | 2/2013 | Gayde et al. |
| 2013/0051379 A1 | 2/2013 | Wang et al. |
| 2013/0065562 A1 | 3/2013 | Singh |
| 2013/0065585 A1 | 3/2013 | Pelletier et al. |
| 2013/0111038 A1 | 5/2013 | Girard |
| 2013/0121322 A1 | 5/2013 | Salkintzis |
| 2013/0143526 A1 | 6/2013 | Kanugovi et al. |
| 2013/0143542 A1 | 6/2013 | Kovvali et al. |
| 2013/0150079 A1 | 6/2013 | Krasner |
| 2013/0165131 A1 | 6/2013 | Garcia Martin et al. |
| 2013/0170351 A1 | 7/2013 | Reznik et al. |
| 2013/0189996 A1 | 7/2013 | Sridhar et al. |
| 2013/0208696 A1 | 8/2013 | Garcia Martin et al. |
| 2013/0217326 A1 | 8/2013 | Symons |
| 2013/0225079 A1 | 8/2013 | Ashour et al. |
| 2013/0230011 A1 | 9/2013 | Rinne et al. |
| 2013/0303194 A1 | 11/2013 | Rowles |
| 2013/0308445 A1 | 11/2013 | Xiang et al. |
| 2014/0120990 A1 | 5/2014 | Parco et al. |
| 2014/0200002 A1 | 7/2014 | Vangala et al. |
| 2014/0213188 A1 | 7/2014 | Kim et al. |
| 2014/0256248 A1 | 9/2014 | Cargill et al. |
| 2014/0329462 A1 | 11/2014 | Khorram et al. |
| 2014/0357293 A1 | 12/2014 | Tsaur |
| 2015/0011161 A1 | 1/2015 | Dhayni |
| 2015/0024682 A1 | 1/2015 | Dhayni |
| 2015/0024743 A1 | 1/2015 | Zheng |
| 2015/0072615 A1 | 3/2015 | Mofidi et al. |
| 2015/0135336 A1 | 5/2015 | Arasavelli |
| 2015/0156783 A1 | 6/2015 | Klang et al. |

FOREIGN PATENT DOCUMENTS

| | | |
|---|---|---|
| EP | 2533571 | 12/2012 |
| EP | 2632072 | 8/2013 |
| EP | 2603046 | 12/2013 |
| GB | 2370449 | 6/2002 |
| WO | WO2012121757 | 9/2012 |

(56) References Cited

FOREIGN PATENT DOCUMENTS

| WO | WO2012149954 | 11/2012 |
|---|---|---|
| WO | WO2012168152 | 12/2012 |
| WO | WO2013127691 | 9/2013 |

OTHER PUBLICATIONS

U.S. Office Action dated Mar. 22, 2012 in U.S. Appl. No. 12/946,611.
U.S. Notice of Allowance dated Nov. 2, 2012 in U.S. Appl. No. 12/946,611.
U.S. Office Action dated Mar. 13, 2012 in U.S. Appl. No. 12/624,643.
U.S. Notice of Allowance dated Aug. 8, 2012 in U.S. Appl. No. 12/624,643.
U.S. Office Action dated Sep. 13, 2013 in U.S. Appl. No. 13/681,141.
U.S. Office Action dated Apr. 22, 2013 in U.S. Appl. No. 13/681,141.
U.S. Office Action dated Apr. 7, 2014 in U.S. Appl. No. 13/681,141.
U.S. Office Action dated Apr. 17, 2015 in U.S. Appl. No. 13/681,141.
U.S. Office Action dated Aug. 18, 2015 in U.S. Appl. No. 13/681,141.
U.S. Office Action dated Jan. 11, 2016 in U.S. Appl. No. 13/681,141.
U.S. Notice of Allowance dated Apr. 13, 2016 in U.S. Appl. No. 13/681,141.
U.S. Office Action dated Oct. 23, 2014 in U.S. Appl. No. 13/748,454.
U.S. Office Action dated Dec. 30, 2015 in U.S. Appl. No. 14/520,053.
U.S. Office Action dated Jun. 9, 2016 in U.S. Appl. No. 14/520,053.
U.S. Office Action dated May 3, 2016 in U.S. Appl. No. 14/724,201.
U.S. Office Action dated Aug. 12, 2016 in U.S. Appl. No. 14/724,201.
U.S. Office Action dated Jan. 17, 2017 in U.S. Appl. No. 14/724,201.
U.S. Notice of Allowance dated Jun. 19, 2017 in U.S. Appl. No. 14/724,201.
U.S. Notice of Allowance dated Sep. 26, 2017 in U.S. Appl. No. 14/724,201.
Feng, S. et al., "Self-Organizing Networks (SON) in 3GPP Long Term Evolution," Novel Mobile Radio Research, May 20, 2008.
Greenpacket, "Wi-Fi Offload: Authentication and Security Through EAP-Based Approach," Interface, May 2012.
"Universal Mobile Telecommunications System (UMTS); LTE; Access Network Discovery and Selection Function (ANDSF) Management Object (MO)," 3GPP TS 24.312, ETSI TS 124 312 v11.4.0 (Oct. 2012).
Desta Haileselassie Hagos, Rudiger Kapitza, "Study on Performance-Centric Offload Strategies for LTE Networks," TU Braunschweig, Wireless and Mobile Networking Conference (WMNC), 2013 6th Joint IFIP, 2013.
Desta Haileselassie Hagos, "The Performance of WiFi Offload in LTE Networks," Master's Thesis, Lulea University of Technology, Jun. 2012.
Heinonen et al., "Advanced EPC Architecture for Smart Traffic Steering," MEVICO, Nov. 2011.
ETSI, "Universal Mobile Telecommunications System (UMTS); LTE; Access Network Discovery and Selection Function (ANDSF) Management Object (MO)," Apr. 2013, Version 11.6.0, Release 11, France.
Desh, "15 Cellphone chargers that harness kinetic energy for a clean recharge". Copyright Instablogs Network 2009. http://www.greendiary.com/entry/15-cellphone-chargers-that-harness-kinetic-energy-for-a-clean-recharge/. Last accessed Feb. 15, 2011, 10 pages.
Nicole Casal Moore, "Tiny Generators run on good vibrations". Copyright 2009-2011 Futurity.org. http://www.futurity.org/science-technology/tiny-generators-run-on-good-vibrations/. Last accessed Feb. 15, 2011, 5 pages.
Noel McKeegan, "Good vibrations: tiny generator harnesses kinetic energy to power wireless electrical systems". Copyright gizmag 2003-2011. http://www.gizmag.com/go/7584/. Last accessed Feb. 15, 2011, 4 pages.
S.P. Beeby, et al., "Kinetic Energy Harvesting". ACT Workshop on Innovative Concepts. ESA-ESTEC Jan. 28-29, 2008. http://www.esa.int/gsp/ACT/events/workshops/ACT-ART-Bridge2Space-Beeby.pdf Last accessed Feb. 15, 2011, 10 pages.
"Directory:Human-Powered". http://peswiki.com/index.php/Directory:Human-Powered. Last accessed Feb. 15, 2011, 11 pages.
Alkhawlani et al., "Intelligent radio network selection for next generation networks," Informatics and Systems (INFOS), 2010 the 7th International Conference on, 2010, pp. 1, 7, 28-30.
Changqing et al., "Optimal Channel Access for TCP Performance Improvement in Cognitive Radio Networks: A Cross-Layer Design Approach," Global Telecommunications Conference, 2009. GLOBECOM 2009. IEEE, 2009, pp. 1, 6.
Samdanis et al., "Traffic Offload Enhancements for eUTRAN," Communications Surveys & Tutorials, IEEE, 2012, vol. 14, No. 3, pp. 884,896.
Watanabe et al., "Radio network selection scheme notified by the each network's real-time performance in the multi-layered communication network," Wireless Personal Multimedia Communications (WPMC), 2012 15th International Symposium on, 2012, pp. 169, 171, 24-27.
Kwon et al., "Load Based Cell Selection Algorithm for Faulted Handover in Indoor Femtocell Network," Vehicular Technology Conference (VTC Spring), 2011 IEEE 73rd, 2011, pp. 1, 5, 15-18.
Wei et al., "A mobility load balancing optimization method for hybrid architecture in self-organizing network," Communication Technology and Application (ICCTA 2011), IET International Conference on, 2011, pp. 828, 832.
"Macro to small cell, metro cell Hand-in" Alcatel-Lucent, AT&T R3-112026 http://www.3gpp.org/ftp/Specs/html-info/TDocExMtg--R3-73--28511.htm.
Stemm, Mark, and Randy H. Katz. "Vertical handoffs in wireless overlay networks." Mobile Networks and applications 3.4 (1998): 335-350. http://morse.colorado.edu/~timxb/5520/ho/8.pdf.
Chiu, Ming-Hsing, and Mostafa A. Bassiouni. "Predictive schemes for handoff prioritization in cellular networks based on mobile positioning." Selected Areas in Communications, IEEE Journal on 18.3 (2000): 510-522. http://dx.doi.org/10.1109/49.840208.
Soh, Wee-Seng, and Hyong S. Kim. "QoS provisioning in cellular networks based on mobility prediction techniques." Communications Magazine, IEEE 41.1 (2003): 86-92. http://citeseerx.ist.psu.edu/viewdoc/download?doi=10.1.1.98.2622&rep=rep1&type=pdf.
Pollini, Gregory P. "Trends in handover design." Communications Magazine, IEEE 34.3 (1996): 82-90. http://inrg.csie.ntu.edu.tw/course/wms/paper/Pollin96.pdf.

\* cited by examiner

USER EQUIPMENT DETECTION OF INTERFERENCE-SENSITIVE DEVICES

CROSS-REFERENCE TO RELATED APPLICATIONS

This application is a continuation of and claims priority to U.S. patent application Ser. No.14/724,201, entitled "User Equipment Detection of Interference-Sensitive Devices," filed May 28, 2015, now U.S. Pat. No. 9,900,762, which is incorporated herein by reference in its entirety.

BACKGROUND

Near-field communications ("NFC") is a short-range wireless technology that allows detection and communication between powered active "initiator" devices and non-powered passive "target" devices. A passive target device is typically a very small sticker with no connected power source. Passive target devices receive power from a radio frequency ("RF") field from an initiator device. Upon receipt of an RF field, the passive target device establishes a transponder relationship with the initiator device, and the passive target device can transmit information to the initiator device.

Wireless voice and data services are expanding beyond the limits of available dedicated cellular spectrum. Clearing new dedicated spectrum for cellular use is complex and expensive, especially in cases where legacy, interference-sensitive devices and services already occupy the spectrum or are sensitive to transmissions from such spectrum. A particularly challenging interference sensitivity case occurs between mobile devices, such as cellular telephones, that operate in proximity to pacemakers and other medical devices, high definition televisions and other consumer electronics, and global positioning sensor ("GPS") receivers. In this case, regulators should plan and fund the replacement of these legacy devices before selling spectrum or find spectrum buyers that are willing to wait years to put purchased spectrum to use. These cases limit regulator opportunity to sell spectrum (filling government coffers) and they limit cellular operator and device vendor access to much needed spectrum to meet subscriber demands. In order to support such dramatic growth, cellular operators, device vendors and regulators are now looking beyond traditional dedicated spectrum options. Shared spectrum use has some cost and resource efficiency advantages, especially in cases where demand is temporary and dynamic. Where demand is temporary, it is sometimes advantageous to use spectrum on a temporary basis rather than making a permanent investment in such spectrum. Unfortunately this shared spectrum option has similar technical challenges as dedicated spectrum clearing—that is, there is currently no practical and cost-effective means to identify and protect interference-sensitive devices from nearby cellular transmissions without replacement.

SUMMARY

Concepts and technologies are described herein for user equipment ("UE") detection of interference-sensitive devices. According to one aspect disclosed herein, a mobile initiator device can utilize a near-field communications ("NFC") hardware component to generate a radio frequency ("RF") field that is used to activate a passive NFC component associated with an interference-sensitive device. The mobile initiator device can utilize the NFC hardware component to receive information about an interference sensitivity of the interference-sensitive device. The mobile initiator device can adjust one or more operational aspects of the mobile initiator device to accommodate the interference sensitivity information of the interference-sensitive device.

In some embodiments, the mobile initiator device can monitor a mobility state of the mobile initiator device. In these embodiments, the mobile initiator device can generate the RF field in response to a change in the mobility state.

In some embodiments, the information about the interference sensitivity includes at least one of a device type, a radio type, a receive sensitivity frequency band, a transmit sensitivity frequency band, a receive filter sensitivity, a transmit filter sensitivity, a receive in-band noise rise limit, a receive in-band receiver overload limit, or a transmit power range.

In some embodiments, the operational aspect of the mobile initiator device includes an adjustment to a transmit power of the mobile initiator device. In some embodiments, the operational aspect of the mobile initiator device includes an adjustment to a frequency upon which the mobile initiator device transmits. In some embodiments, the operational aspect of the mobile initiator device includes an adjustment to a duplexing type utilized by the mobile initiator device.

In some embodiments, the mobile initiator device, in response to receiving the information about the interference sensitivity of the interference-sensitive device, can generate a confirmation message to confirm receipt of the information about the sensitivity of the interference-sensitive device and can send the confirmation message to the interference-sensitive device.

According to another aspect disclosed herein, an interference-sensitive device can activate a passive near-field communications component in response to an RF field generated by a mobile initiator device. The interference-sensitive device can provide information about one or more interference sensitivities to the mobile initiator device. The interference-sensitive device can include any device that is sensitive to RF interference, some examples of which include, but are not limited to, medical devices such as pacemakers and consumer electronics such as high definition televisions, WI-FI routers, cordless phones, and baby monitors.

In some embodiments, the interference-sensitive device can provide the information about one or more interference sensitivities to the mobile initiator in accordance with a retransmission scheme. The retransmission scheme may be constant or periodic. In these embodiments, the interference-sensitive device can receive a confirmation message from the mobile initiator device and, in response, can cease retransmission of the information about the sensitivity of the interference-sensitive device.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter.

Furthermore, the claimed subject matter is not limited to implementations that solve any or all disadvantages noted in any part of this disclosure.

DETAILED DESCRIPTION

Figure 1:
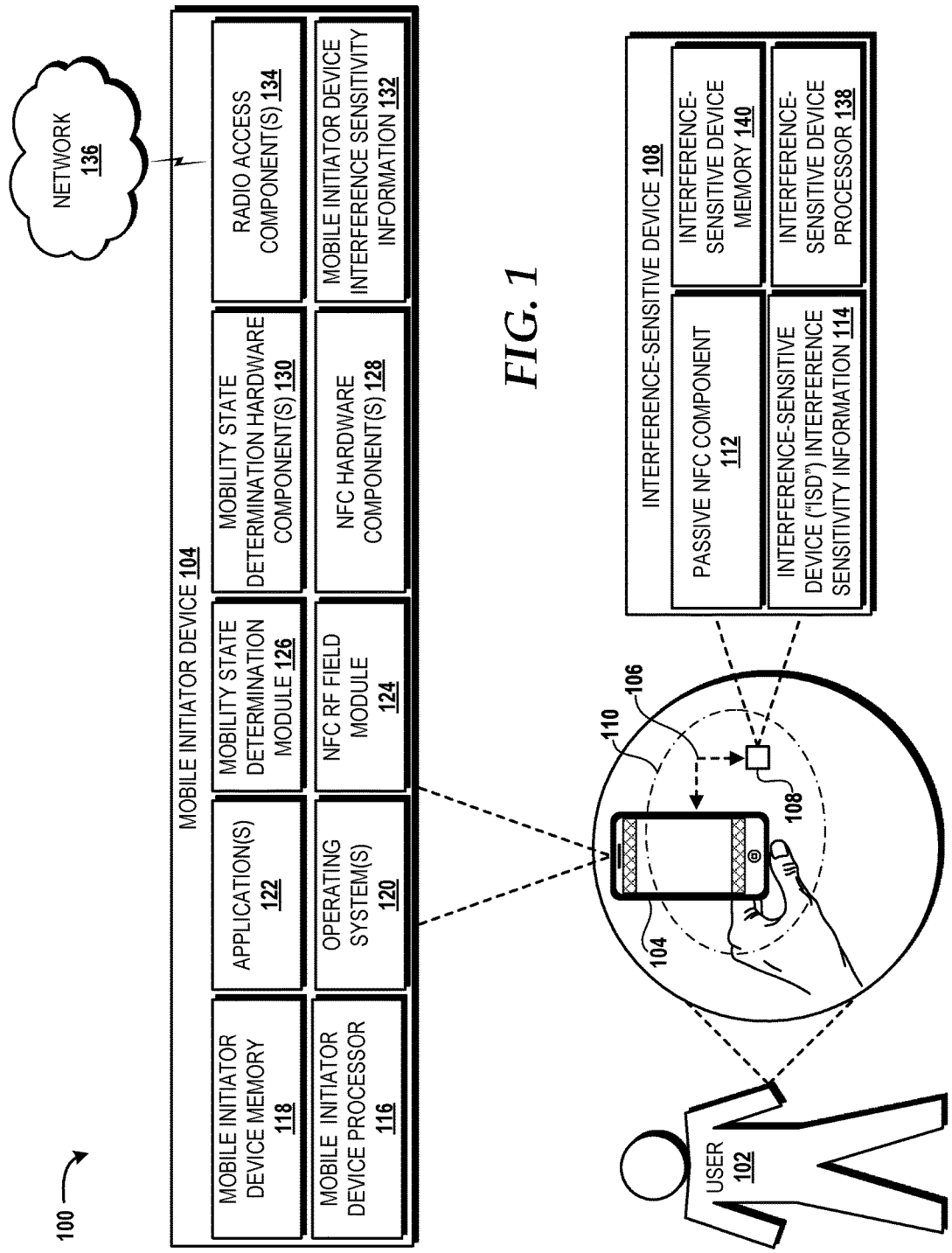
FIG. 1 is a block diagram illustrating aspects of an illustrative operating environment for various concepts disclosed herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of traffic steering across radio access technologies and radio frequencies utilizing cell broadcast messages will be presented.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The illustrated operating environment 100 includes a user 102 who is associated with a mobile initiator device 104. The mobile initiator device 104 can be a cellular telephone, a feature phone, a smartphone, a mobile computing device, a portable television, a portable video game console, other computing device, or other user equipment ("UE"). The mobile initiator device 104 can establish a connection 106, via near-field communications ("NFC"), with one or more passive target devices, such as an interference-sensitive device 108, in response to the target device(s) receiving power from a radio frequency ("RF") field 110 generated by the mobile initiator device 104. The interference-sensitive device 108 can include any device that is sensitive to RF interference, some examples of which include, but are not limited to, medical devices such as pacemakers and consumer electronics such as high definition televisions, WI-FI routers, cordless phones, and baby monitors. Upon receipt of the RF field 110, the target device(s) can each establish a transponder relationship with the mobile initiator device 104, and the target device(s) can exchange information with the mobile initiator device 104 via the connection 106.

In the illustrated example, the interference-sensitive device 108 can detect, via a passive NFC component 112, the RF field 110, to establish a transponder relationship with the mobile initiator device 104, and to provide interference-sensitive device interference sensitivity information 114 (hereinafter "ISD interference sensitivity information 114") to the mobile initiator device 104. The ISD interference sensitivity information 114 can include any information regarding one or more operational aspects of the interference-sensitive device 108 that is/are sensitive to RF interference. By way of example, the ISD interference sensitivity information 114 can include a device type (e.g., a consumer electronics device, medical device, public safety device, or military device), a radio type (e.g., receive-only, transmit-only, or receive and transmit), one or more receive sensitive frequency bands (e.g., including a start frequency and a stop frequency), a receive filter selectivity ("$Q_{rx}$"), a transmit filter selectivity ("$Q_{tx}$"), a receive in-band noise rise limit, a receive in-band receiver overload limit, one or more transmit sensitive frequency bands (e.g., including a start frequency and a stop frequency) a transmit power range, or some combination thereof.

The mobile initiator device 104 can adjust one or more operational aspects of the mobile initiator device 104 to accommodate one or more interference sensitivities of the interference-sensitive device 108 as specified in the ISD interference sensitivity information 114. The operational aspects of the mobile initiator device 104 can include any operational aspect of the mobile initiator device 104 that might interfere with one or more operational aspects of the interference-sensitive device 108. Some examples of operational aspects of the mobile initiator device 104 include, but are not limited to, a transmit power, a frequency upon which the mobile initiator device 104 transmits, a duplexing type utilized by the mobile initiator device 104, a communications type (e.g., cellular, WI-FI, BLUETOOTH), and/or the like.

The illustrated mobile initiator device 104 includes a mobile initiator device processor 116 (hereinafter "MID processor 116"), a mobile initiator device memory 118 (hereinafter "MID memory 118"), one or more operating systems 120, one or more applications 122, an NFC RF field module 124, a mobility state determination module 126, one or more NFC hardware components 128, one or more mobility state determination hardware components 130, mobile initiator device interference sensitivity information 132 (hereinafter "MID sensitivity information 132"), and one or more radio access components 134.

Figure 2:
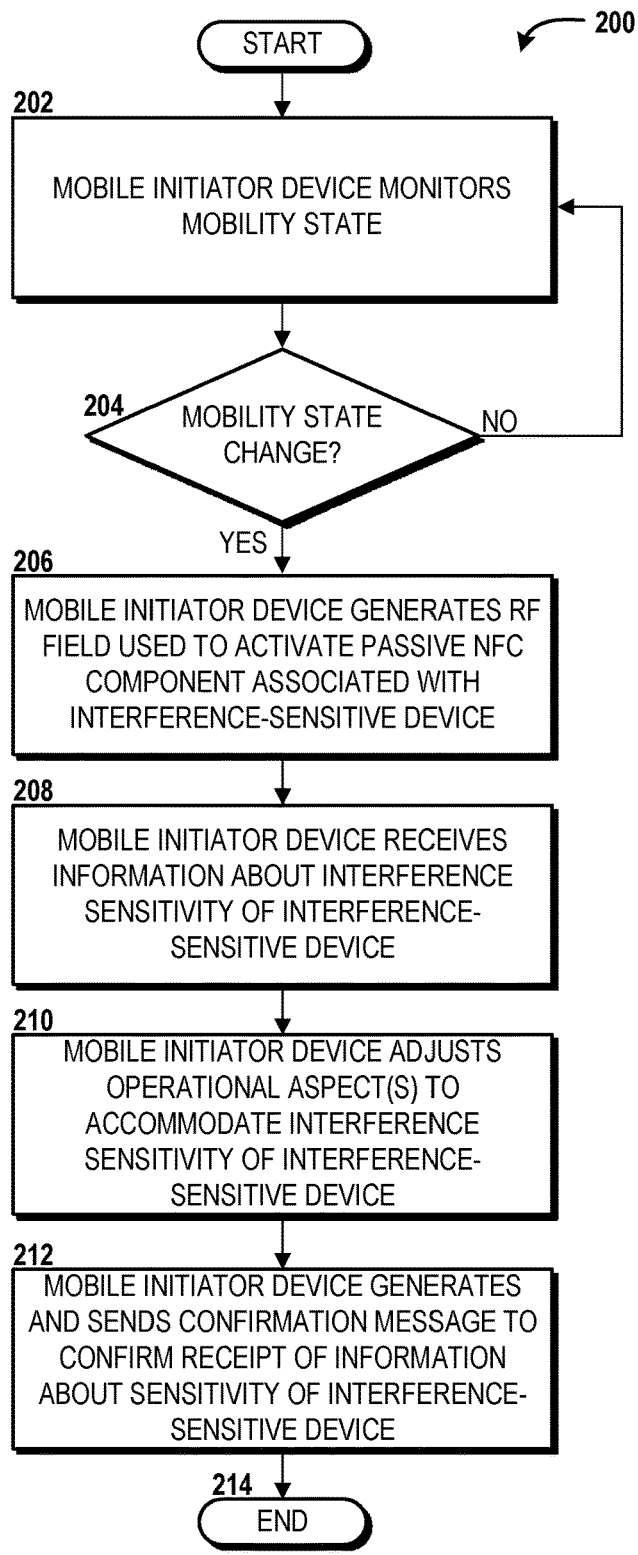
FIG. 2 is a flow diagram illustrating aspects of a method for user equipment ("UE") detection of interference-sensitive devices from the perspective of a UE device operating as a mobile initiator device, according to an illustrative embodiment.
Figure 3:
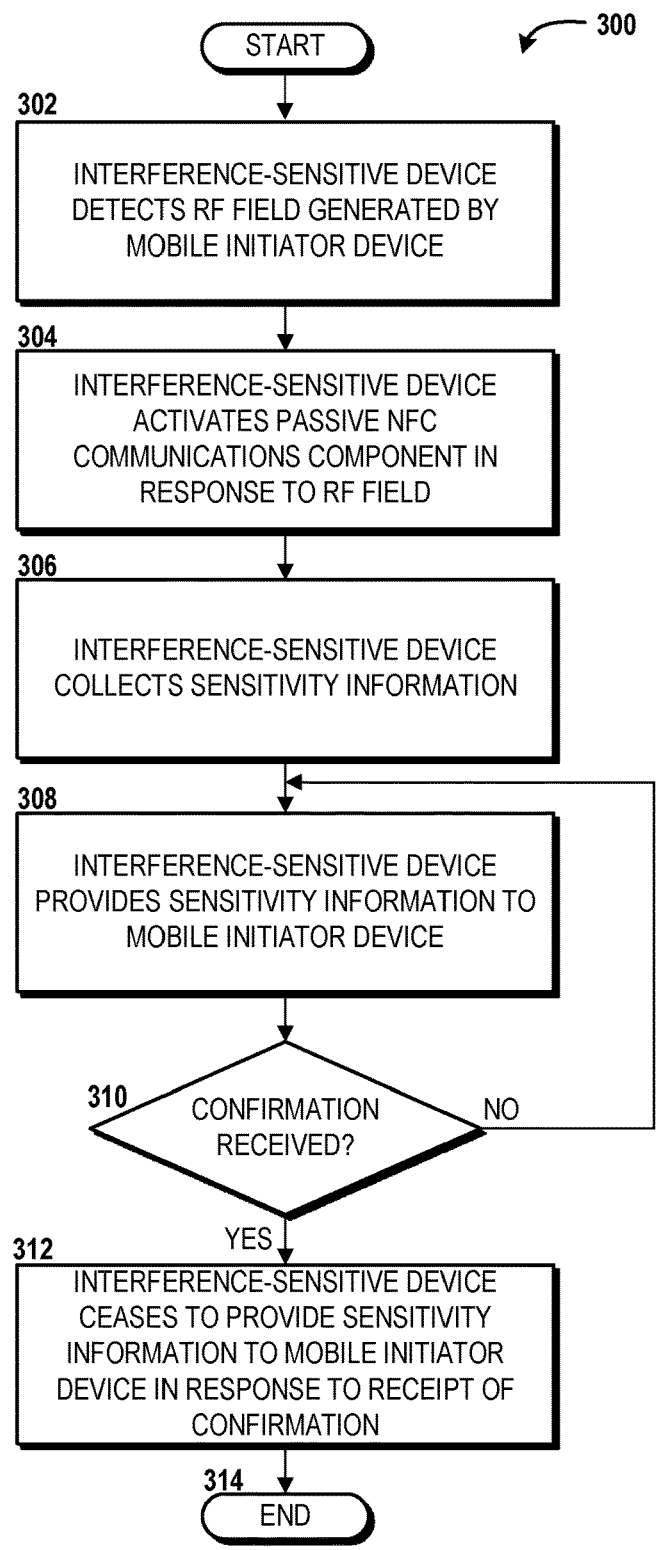
FIG. 3 is a flow diagram illustrating aspects of a method for UE detection of interference-sensitive devices from the perspective of an interference-sensitive device, according to an illustrative embodiment.

The MID processor 116 can include one or more processing units configured to process data, execute computer-executable instructions of one or more application programs such as the application(s) 122, which can be stored in the MID memory 118, and communicate with other components of the mobile initiator device 104 in order to perform various operations described herein, such as the operations illustrated and described herein with reference to FIGS. 2 and 3. The MID processor 116 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore the functionality of processing units is not described in further detail herein.

The MID memory 118 can include, but is not limited to, processor registers, processor cache, random access memory ("RAM"), other volatile and non-volatile memory devices, semi-permanent or permanent memory types; for example, tape-based media, optical media, flash media, hard disks, combinations thereof, and the like. While the MID memory 118 is illustrated as residing proximate to the MID processor 116, it should be understood that the MID memory 118 may be a remotely accessed storage system, for example, a server and/or database on a communications network, a remote hard disk drive, a removable storage medium, a database, a server, an optical media writer, combinations thereof, or the like. Memory units are generally known, and therefore the functionality of memory units is not described in further detail herein.

In the claims, the phrase "computer storage medium" and variations thereof is intended to encompass devices such as the MID memory 118 and other memory components disclosed herein and does not include waves or signals per se and/or communication media such as computer-readable instructions, data structures, program modules, or other data in a modulated data signal such as a carrier wave or other transport mechanism and includes any delivery media.

The operating system(s) 120 can include one or more programs for controlling the operation of the mobile initiator device 104. The operating system(s) 120 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The application(s) 122 can execute on top of the operating system(s) 120. The application(s) 122 can include, for example, one or more presence applications, one or more visual voice mail applications, one or more messaging applications, one or more text-to-speech and/or speech-to-text applications, one or more add-ons, one or more plug-ins, one or more email applications, one or more music applications, one or more video applications, one or more camera applications, one or more location-based service applications, one or more power conservation applications, one or more game applications, one or more productivity applications, one or more entertainment applications, one or more enterprise applications, combinations thereof, and the like.

The NFC RF field module 124 can include computer-readable instructions that can be executed by one or more of the NFC hardware component(s) 128 (e.g., a microcontroller) and/or can be executed by one or more processors, such as the MID processor 116, to cause the NFC hardware component(s) 128 to activate and deactivate the RF field 110 according to duty cycle criteria, which can include an absolute mobility state of the mobile initiator device 104, a mobility state change, and/or a cell visitation history as will be described in greater detail below. The NFC RF field module 124 can be embedded in the NFC hardware component(s) 128 and/or can be stored in a memory, such as the MID memory 118, and made accessible to the NFC hardware component(s) 128.

The NFC RF field module 124 can cause the NFC hardware component(s) 128 to automatically activate the RF field 110 when NFC detection and data exchange are likely to be utilized. The NFC RF field module 124 also can cause the NFC hardware component(s) 128 to automatically deactivate the RF field 110 for battery conservation when NFC detection and data exchange are less likely to be utilized. The determination of whether or not NFC should be utilized can be based upon the absolute mobility state of the mobile initiator device 104, changes in the mobility state, and/or cell visitation history. Whether or not NFC detection and data exchange should be utilized is rarely 100% predictable. For this reason, the RF field 110 can be cycled on and off according to a battery-efficient duty cycle (also referred to herein as a "gating pattern"). The gating pattern can provide a balance between detection success and battery efficiency.

NFC communications are low-powered and typically only useful within a relatively short range (e.g., few feet) between the initiator and target devices—the mobile initiator device 104 and the interference-sensitive device 108, respectively, in the illustrated example. NFC communications between mobile initiator and target devices are therefore unreliable or relatively short-lived if relative mobility speed is high. Battery-powered NFC communications are therefore useful only when the mobile initiator and target devices are relatively stationary. For this reason, a highly mobile initiator device (e.g., the user 102 driving or riding in a vehicle with the mobile initiator device 104—hereinafter "vehicular mobility state") can conserve battery by activating the RF field 110 infrequently and for a relatively short hold time. The probability of useful NFC communication is higher if the user 102 is walking with the mobile initiator device 104 (hereinafter "pedestrian mobility state"). In the pedestrian mobility state, the RF field 110 should be active most of the time in order for the mobile initiator device 104 to detect and communicate with nearby target devices such as the interference-sensitive device 108. If the mobility state is "stationary" (e.g., the user 102 has placed the mobile initiator device 104 on a desk or other surface or the mobile initiator device 104 is in a pocket while the user 102 is seated), then the likelihood of new NFC target devices is low. In this case, the stationary initiator device can conserve battery by activating the RF field 110 infrequently and for a relatively short hold time. In these examples, the RF field duty cycles can be adapted as follows:

Vehicular=driving: Low RF field duty cycle=high battery efficiency;
Pedestrian=walking: High RF field duty cycle=high detection success;
Stationary=sitting: Low RF field duty cycle=high battery efficiency.

The mobility state—vehicular, pedestrian, or stationary, for example—can be determined by the mobile initiator device 104 via execution, via one or more processors, of instructions included in the mobility state determination module 126 based upon output provided by the mobility state determination hardware component(s) 130. The mobility state determination module 126 can be programmed to define the RF field duty cycles for one or more mobility states. The mobility state determination module 126 can receive output from the mobility state determination hardware component(s) 130 and can determine, based at least in part upon the output, the RF field duty cycle to employ for the mobility state associated with the received output.

The mobility state determination module 126 also can detect changes in the mobility state of the mobile initiator device 104. In response to detecting a change, the mobility state determination module 126 can instruct the NFC RF field module 124 to cause the NFC hardware component(s) 128 to activate the RF field 110 for a specified time to detect nearby NFC target devices, such as the interference-sensitive device 108.

The NFC hardware component(s) 128 can include one or more devices that support NFC-compatible air-interface protocols, standards, and specifications. For example, the NFC hardware component(s) 128 can include one or more transceiver devices each capable of generating the RF field 110 at a designated operating frequency, such as 13.56 megahertz ("MHz"). The NFC hardware component(s) 128 also can include one or more antennas, one or more microcontrollers, one or more memory components, and/or the like. Moreover, the NFC hardware component(s) 128 can be built-in to the mobile initiator device 104 and/or in communication with the mobile initiator device 104 via BLUETOOTH, other RF, a wired connection, and/or the like as an add-on component to the mobile initiator device 104.

The mobile initiator device interference sensitivity information 132 (hereinafter "MID interference sensitivity information 132") can include any information regarding one or more operational aspects of the mobile initiator device 104 that is/are sensitive to RF interference. By way of example, the MID interference sensitivity information 132 can include a radio type (e.g., receive-only, transmit-only, or receive and transmit), one or more receive sensitive frequency bands (e.g., including a start frequency and a stop frequency), a receive filter selectivity ("$Q_{rx}$"), a transmit filter selectivity ("$Q_{tx}$"), a receive in-band noise rise limit, a receive in-band receiver overload limit, one or more transmit sensitive frequency bands (e.g., including a start frequency and a stop frequency) a transmit power range, or some combination thereof.

The mobile initiator device 104 is configured to connect to and communicate, via one or more of the radio access components 134, with a network 136 for voice and/or data communications between the mobile initiator device 104 and one or more other mobile devices, computers, servers, networking devices, and/or other networks (not shown). The network 136 may operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other 802.XX technologies, and/or the like. The network 136 can include one or more radio access networks ("RANs"). A RAN can utilize various channel access methods (which may or may not be used by the aforementioned standards) including, but not limited to, Time Division Multiple Access ("TDMA"), Frequency Division Multiple Access ("FDMA"), Single Carrier FDMA ("SC-FDMA"), CDMA, wideband CDMA ("W-CDMA"), Orthogonal Frequency Division Multiplexing ("OFDM"), Space Division Multiple Access ("SDMA"), and/or the like to provide a radio/air interface to the mobile initiator device 104. Data communications can be provided in part by a RAN using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, a RAN may be a GSM RAN ("GRAN"), a GSM EDGE RAN ("GERAN"), a UMTS Terrestrial Radio Access Network ("UTRAN"), an E-UTRAN, any combination thereof, and/or the like.

The network 136 can include a wireless wide area network ("WWAN"), which may, in turn, include one or more core networks such as a circuit-switched core network ("CS CN"), a packet-switched core network ("PS CN"), and/or an IP multimedia subsystem ("IMS") core network. The WWAN can utilize one or more mobile telecommunications technologies, such as those described above, to provide voice and/or data services via one or more RANs to one or more radio components of one or more mobile devices, such as the radio access component(s) 134 of mobile initiator device 104. Moreover, a mobile telecommunications network can provide a connection to an internet or other WAN so that the mobile initiator device 104 can access internet content such as websites, streaming media, online video games, downloadable content, and the like.

A RAN operating within or as part of the network 136 can include one or more cells. As used herein, a "cell" refers to a geographical area that is served by one or more base stations operating within a RAN. As used herein, a "base station" refers to a radio receiver and/or transmitter (collectively, transceiver) that is/are configured to provide a radio/air interface by which one or more mobile devices, such as the mobile initiator device 104, can connect to the network 136. Accordingly, a base station is intended to encompass one or more base transceiver stations ("BTSs"), one or more Node Bs, one or more eNodeBs, and/or other networking nodes that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to/from the network 136.

The mobile initiator device 104 can camp on and monitor cellular sites while in an idle mode, thus allowing call setup and incoming call page detection. Each cell site sector carrier has a unique identifier referred to herein as a physical cell identifier ("PCP"), which is broadcast by the cell site and detected by the mobile initiator device 104 while in active or idle mode within the associated service area. When the mobile initiator device 104 activates the RF field 110, the mobile initiator device 104 may or may not receive a response from nearby NFC devices, such as the interference-sensitive device 108. Each time the mobile initiator device 104 does receive a response from one or more nearby NFC target devices, the mobile initiator device 104 can record the pertinent PCI of the camping cell site in the MID memory 118. Over time, a cell visitation history can be built. The cell visitation history can include which PCIs do and do not have one or more overlaid NFC devices. The cell visitation history can be used to further optimize the RF field activation. For example, the mobile initiator device 104 can use a higher RF field duty cycle and improve detection probability and time when camping on cells with a history of NFC device detection. The mobile initiator device 104 can reduce RF field duty cycle and conserve battery when camping on cells with no history of NFC device detection.

The illustrated interference-sensitive device 108 also includes an interference-sensitive device processor (hereinafter "ISD processor 138") and an interference-sensitive device memory (hereinafter "ISD memory 140"). The ISD processor 138 can include one or more processing units configured to process data, execute computer-executable instructions of one or more application programs (not shown), which can be stored in the ISD memory 140, and communicate with other components of the interference-sensitive device 108 in order to perform various operations described herein, such as the operations illustrated and described herein with reference to FIGS. 4 and 5. The ISD processor 138 may be a standard central processor that performs arithmetic and logical operations, a more specific purpose PLC, a programmable gate array, a system-on-a-chip, or other type of processor known to those skilled in the art and suitable for controlling the operation of the server computer. Processing units are generally known, and therefore the functionality of processing units is not described in further detail herein.

The ISD memory 140 can include, but is not limited to, processor registers, processor cache, RAM, other volatile and non-volatile memory devices, semi-permanent or permanent memory types; for example, tape-based media, optical media, flash media, hard disks, combinations thereof, and the like. While the ISD memory 140 is illustrated as residing proximate to the ISD processor 138, it should be understood that the ISD memory 140 may be a remotely accessed storage system, for example, a server and/or database on a communications network, a remote hard disk drive, a removable storage medium, a database, a server, an optical media writer, combinations thereof, or the like. Memory units are generally known, and therefore the functionality of memory units is not described in further detail herein.

Turning now to FIG. 2, a flow diagram illustrating aspects of a method 200 for UE detection of one or more interference-sensitive devices, such as the interference-sensitive device 108, from the perspective of a UE device, such as the mobile initiator device 104, will be described, according to an illustrative embodiment. It should be understood that the operations of the illustrative methods disclosed herein are not necessarily presented in any particular order and that performance of some or all of the operations in an alternative order(s) is possible and is contemplated. The operations have been presented in the demonstrated order for ease of description and illustration. Operations may be combined, separated, added, omitted, modified, and/or performed simultaneously or in another order without departing from the scope of the subject disclosure.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multi-processor systems, distributed computing systems, mini-computers, mainframe computers, personal computers, hand-held computing devices, microprocessor-based, programmable consumer electronics, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 200 is described from the perspective of the mobile initiator device 104. The method 200 begins and proceeds to operation 202, where the mobile initiator device 104 monitors a mobility state of the mobile initiator device 104. From operation 202, the method 200 proceeds to operation 204, where the mobile initiator device 104 determines whether the mobility state has changed. If the mobility state has not changed, the method 200 returns to operation 202, where the mobile initiator device 104 continued to monitor the mobility state. If, however, the mobility state has changed, the method 200 proceeds from operation 204 to operation 206. At operation 206, the mobile initiator device 104 generates an RF field, such as the RF field 110 (shown in FIG. 1). The RF field 110 is used to activate one or more passive NFC components associated with one or more interference-sensitive devices, such as the passive NFC component 112 of the interference-sensitive device 108.

From operation 206, the method 200 proceeds to operation 208, where the mobile initiator device 104 receives information about one or more interference sensitivities of the interference-sensitive device 108, such as the ISD interference sensitivity information 114. By way of example, the ISD interference sensitivity information 114 can include a device type (e.g., a consumer electronics device, medical device, public safety device, or military device), a radio type (e.g., receive-only, transmit-only, or receive and transmit), one or more receive sensitive frequency bands (e.g., including a start frequency and a stop frequency), a receive filter selectivity ("$Q_{rx}$"), a transmit filter selectivity ("$Q_{tx}$"), a receive in-band noise rise limit, a receive in-band receiver overload limit, one or more transmit sensitive frequency bands (e.g., including a start frequency and a stop frequency) a transmit power range, or some combination thereof.

From operation 208, the method 200 proceeds to operation 210, where the mobile initiator device 104 adjusts one or more operational aspects of the mobile initiator device 104 to accommodate the one or more interference sensitivities specified in the ISD interference sensitivity information 114. The operational aspects of the mobile initiator device 104 can include any operational aspect of the mobile initiator device 104 that might interfere with one or more operational aspects of the interference-sensitive device 108. Some examples of operational aspects of the mobile initiator device 104 include, but are not limited to, a transmit power, a frequency upon which the mobile initiator device 104 transmits, a duplexing type utilized by the mobile initiator device 104, a communications type (e.g., cellular, WI-FI, BLUETOOTH, and/or the like).

From operation 210, the method 200 proceeds to operation 212, where the mobile initiator device 104 generates a confirmation message and sends the confirmation message to the interference-sensitive device to confirm receipt of the ISD interference sensitivity information 114. From operation 212, the method 200 proceeds to operation 214. The method 200 ends at operation 214.

Turning now to FIG. 3, a flow diagram illustrating aspects of a method for UE detection of interference-sensitive devices from the perspective of an interference-sensitive device, such as the interference-sensitive device 108, will be described, according to an illustrative embodiment. The method 300 begins and proceeds to operation 302, where the interference-sensitive device 108 detects an RF field, such as the RF field 110, generated by a UE, such as the mobile initiator device 104. From operation 302, the method 300 proceeds to operation 304, where the interference-sensitive device 108 activates the passive NFC component 112 in response to the RF field 110.

From operation 304, the method 300 proceeds to operation 306, where the interference-sensitive device 108 collects sensitivity information, such as the ISD interference sensitivity information 114. By way of example, the ISD interference sensitivity information 114 can include a device type (e.g., a consumer electronics device, medical device, public safety device, or military device), a radio type (e.g., receive-only, transmit-only, or receive and transmit), one or more receive sensitive frequency bands (e.g., including a start frequency and a stop frequency), a receive filter selectivity ("$Q_{rx}$"), a transmit filter selectivity ("$Q_{tx}$"), a receive in-band noise rise limit, a receive in-band receiver overload limit, one or more transmit sensitive frequency bands (e.g., including a start frequency and a stop frequency) a transmit power range, or some combination thereof.

From operation 306, the method 300 proceeds to operation 308, where the interference-sensitive device 108 provides the ISD interference sensitivity information 114 to the mobile initiator device 104. In some embodiments, the interference-sensitive device 108 provides the ISD interference sensitivity information 114 to the mobile initiator device 104 according to a retransmission scheme, which may include periodic or constant retransmission of the ISD interference sensitivity information 114.

From operation 308, the method 300 proceeds to operation 310, where the interference-sensitive device 108 determines whether a confirmation has been received from the mobile initiator device 104 to confirm receipt of the ISD interference sensitivity information 114. If, at operation 310, the interference-sensitive device 108 determines that a confirmation has not been received, the method 300 returns to operation 308, where the interference-sensitive device 108 continues to provide the ISD interference sensitivity information 114 to the mobile initiator device 104. If, however, at operation 310, the interference-sensitive device 108 determines that a confirmation has been received, the method 300 proceeds to operation 312, where the interference-sensitive device 108 ceases to provide the ISD interference sensitivity information 114 to the mobile initiator device 104 in response to receipt of confirmation from the mobile initiator device 104.

From operation 312, the method 300 proceeds to operation 314. The method 300 ends at operation 314.

The methods 200, 300 described above with reference to FIGS. 2 and 3, respectively, focus on one or more interference-sensitive devices providing sensitivity information to a UE to inform the UE of one or more interference sensitivities. Similarly, the UE can additionally or alternatively inform one or more interference-sensitive devices of one or more interference sensitivities.

Figure 4:
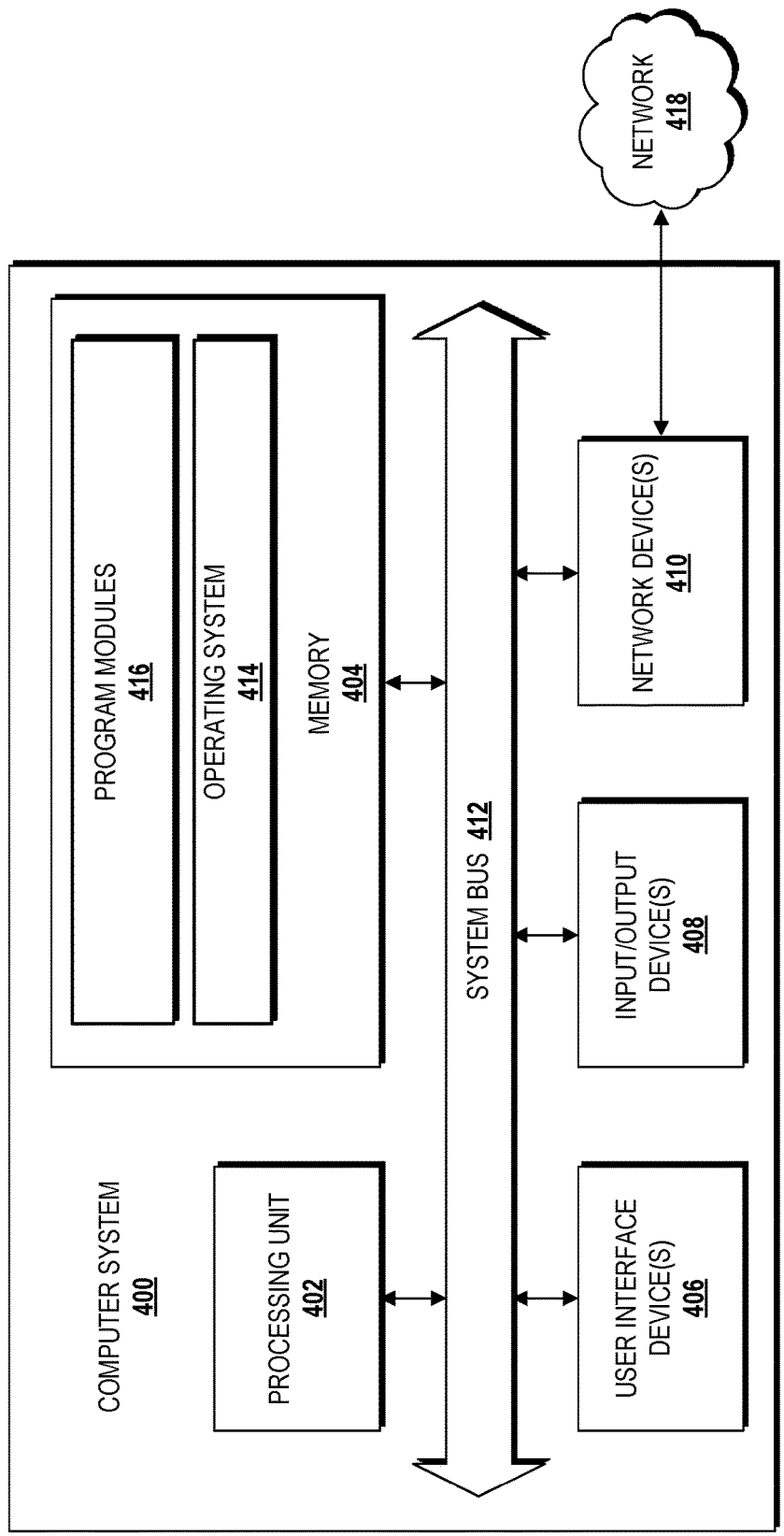
FIG. 4 is a block diagram illustrating an example computer system capable of implementing aspects of the embodiments presented herein.

FIG. 4 is a block diagram illustrating a computer system 400 configured to provide the functionality in accordance with various embodiments of the concepts and technologies disclosed herein. In some implementations, the mobile initiator device 104 can utilize an architecture that is the same as or similar to the architecture of the computer system 400. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose PLC, a programmable gate array, a system-on-a-chip, or other type of processor known to those skilled in the art and suitable for controlling the operation of the server computer. The processing unit 402 can include MID processor 116. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The memory 404 can include the MID memory 118. The memory 404 includes an operating system 414 (e.g., the operating system(s) 120) and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 416 may include various software and/or program modules to perform the various operations described herein. The program modules 416 can include the application(s) 122, the NFC RF field module 124, and/or the mobility state determination module 126 in embodiments that the mobile initiator device 104 is configured like the computer system 400. The program modules 416 and/or other programs can be embodied in computer-readable media containing instructions that, when executed by the processing unit 402, perform the method 200 or at least a portion thereof, described in detail above with respect to FIG. 2. According to embodiments, the program modules 416 may be embodied in hardware, software, firmware, or any combination thereof. Although not shown in FIG. 4, it should be understood that the memory 404, in embodiments that the mobile initiator device 104 is configured like the computer system 400, also can be configured to store the cell visitation history (described above), mobility state information, the MID interference sensitivity information 132, and/or other data.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, personal digital assistants, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer.

The network devices 410 enable the computer system 400 to communicate with other networks or remote systems via a network 418, which can include, for example, the network 136. Examples of the network devices 410 include, but are not limited to, a modem, a radio frequency ("RF") or infrared ("IR") transceiver, a telephonic interface, a bridge, a router, or a network card. The network 418 may include a wireless network such as, but not limited to, a wireless local area network ("WLAN"), a wireless wide area network ("WWAN"), a wireless personal area network ("WPAN") such as provided via BLUETOOTH technology, a wireless metropolitan area network ("WMAN") such as a WiMAX network or metropolitan cellular network. Alternatively, the network 418 may be a wired network such as, but not limited to, a wide area network ("WAN"), a wired LAN such as provided via Ethernet, a wired personal area network n ("PAN"), or a wired metropolitan area network ("MAN").

Figure 5:
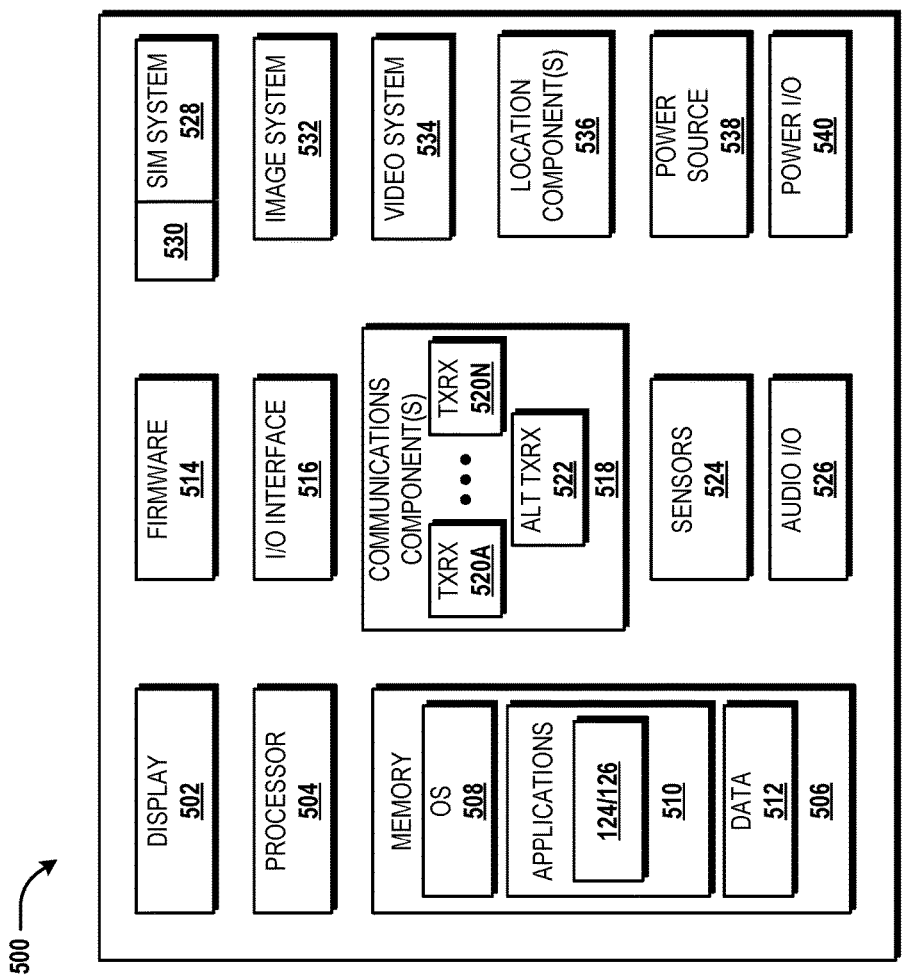
FIG. 5 is a block diagram illustrating an example mobile device capable of implementing aspects of the embodiments disclosed herein.

Turning now to FIG. 5, an illustrative mobile device 500 and components thereof will be described. In some embodiments, the mobile initiator device 104 described above with reference to FIG. 1 can be configured as and/or can have an architecture similar or identical to the mobile device 500 described herein in FIG. 5. It should be understood, however, that the mobile initiator device 104 may or may not include the functionality described herein with reference to FIG. 5. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various graphical user interface ("GUI") elements, text, images, video, advertisements, prompts, virtual keypads and/or keyboards, messaging data, notification messages, metadata, internet content, device status, time, date, calendar data, device preferences, map and location data, combinations thereof, and the like. The mobile device 500 also can include a processor 504 (such as the MID processor 116) and a memory or other data storage device ("memory") 506 (such as the MID memory 118). The processor 504 can be configured to process data and/or can execute computer-executable instructions stored in the memory 506. The computer-executable instructions executed by the processor 504 can include, for example, an operating system 508 (e.g., the operating system(s) 120), one or more applications 510 (e.g., the application(s) 122, the NFC RF field module 124, and/or the mobility state determination module 126), other computer-executable instructions stored in a memory 506, or the like. In some embodiments, the applications 510 also can include a UI application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering content, viewing account information, answering/initiating calls, entering/deleting data, entering and setting user IDs and passwords for device access, configuring settings, manipulating address book content and/or settings, multimode interaction, interacting with other applications 510, and otherwise facilitating user interaction with the operating system 508, the applications 510, and/or other types or instances of data 512 that can be stored at the mobile device 500. The data 512 can include, for example, the cell visitation history (described above), mobility state information, MID interference sensitivity information 132, and/or other data, if desired.

According to various embodiments, the applications 510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks described above herein. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using GSM, CDMA, CDMAONE, CDMA2000, LTE, and various other 2G, 2.5G, 3G, 4G, and greater generation technology standards. Moreover, the communications component 518 may facilitate communications over various channel access methods (which may or may not be used by the aforementioned standards) including, but not limited to, TDMA, FDMA, W-CDMA, OFDM, SDMA, and the like.

In addition, the communications component 518 may facilitate data communications using GPRS, EDGE, the HSPA protocol family, including HSDPA, EUL, or otherwise termed HSUPA, HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, IRDA, NFC, other RF technologies, combinations thereof, and the like. The communications component 518 can include the NFC hardware component (s) 128.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, the mobility state determination hardware component(s) 130, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

Figure 6:
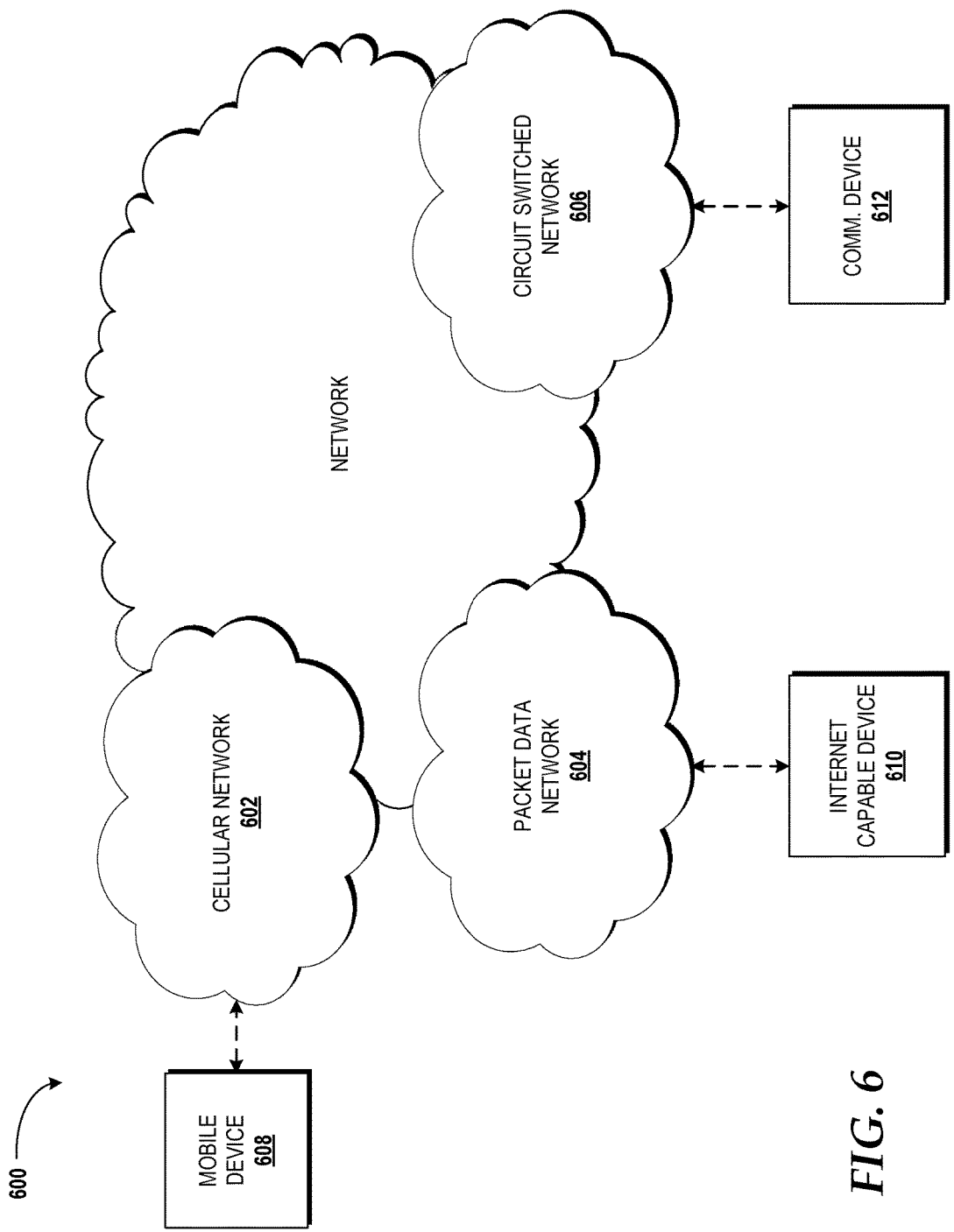
FIG. 6 schematically illustrates a network, according to an illustrative embodiment.

Turning now to FIG. 6, additional details of a network 600 are illustrated, according to an illustrative embodiment. The network 600 includes a cellular network 602, a packet data network 604, for example, the Internet, and a circuit switched network 606, for example, a publicly switched telephone network ("PSTN"). The cellular network 602 includes various components such as, but not limited to, BTSs, NodeBs or eNodeBs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), the network 136, and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, the mobile initiator device 104, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards such as LTE, or the like, as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, the mobile initiator device 104, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, the mobile initiator device 104, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 600 is used to refer broadly to any combination of the networks 602, 604, 606. It should be appreciated that substantially all of the functionality described with reference to the network 600 can be performed by the cellular network 602, the packet data network 604, and/or the circuit switched network 606, alone or in combination with other networks, network elements, and the like.

Based on the foregoing, it should be appreciated that concepts and technologies directed to UE detection of interference-sensitive devices have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A system comprising:
a first device comprising a first near-field communications hardware component, a first processor, and a first memory, wherein the first memory comprises first computer-executable instructions that, when executed by the first processor, cause the first processor to perform first operations; and
a second device comprising an interference-sensitive component, a second near-field communications hardware component, a second processor, and a second memory, wherein the second memory comprises second computer-executable instructions that, when executed by the second processor, cause the second processor to perform second operations;
wherein the first operations comprise
monitoring a mobility state of the first device,
detecting a change in the mobility state of the first device, and
in response to detecting the change in the mobility state of the first device, generating, by the first near-field communications hardware component, a radio frequency field;
wherein the second operations comprise
in response to the radio frequency field, activating the second near-field communications hardware component, and
providing, to the first device, information about an interference sensitivity of the second device, wherein the information about the interference sensitivity comprises a filter selectivity; and
wherein the first operations further comprise
receiving, from the first device, by the first near-field communications hardware component, the information about the interference sensitivity, and
adjusting an operational aspect of the first device to accommodate the interference sensitivity of the second device.

2. The system of claim 1, wherein the information about the interference sensitivity further comprises at least one of a device type, a radio type, a receive sensitivity frequency band, a transmit sensitivity frequency band, a receive in-band noise rise limit, a receive in-band receiver overload limit, or a transmit power range.

3. The system of claim 1, wherein adjusting the operational aspect of the first device comprises adjusting a transmit power of the first device.

4. The system of claim 1, wherein adjusting the operational aspect of the first device comprises adjusting a duplexing type utilized by the first device.

5. The system of claim 1, wherein the first operations further comprise, in response to receiving, from the first device, by the first near-field communications hardware component, the information about the interference sensitivity:
generating a confirmation message to confirm receipt of the information about the interference sensitivity; and
sending the confirmation message to the second device.

6. The system of claim 1, wherein the interference-sensitive component comprises a medical device.

7. The system of claim 1, wherein the interference-sensitive component comprises a consumer electronics device.

8. The system of claim 1, wherein generating the radio frequency field comprises generating the radio frequency field in accordance with a radio frequency field duty cycle associated with the mobility state.

9. A computer-readable storage medium comprising computer-executable instructions that, when executed by a processor of a first device, cause the first device to perform operations comprising:
activating a passive near-field communications component of the first device in response to a radio frequency field generated by a second device, wherein the radio frequency field is generated by the second device in response to detecting a change in a mobility state of the second device; and
providing information about an interference sensitivity of the first device to the second device, wherein the information about the interference sensitivity comprises a filter selectivity.

10. The computer-readable storage medium of claim 9, wherein the information about the interference sensitivity of the first device further comprises at least one of a device type, a radio type, a sensitivity frequency band, a receive in-band noise rise limit, a receive in-band receiver overload limit, a transmit frequency band, or a transmit power range.

11. The computer-readable storage medium of claim 9, wherein providing the information about the interference sensitivity comprises providing the information about the interference sensitivity via a periodic retransmission to the second device.

12. The computer-readable storage medium of claim 11, wherein the operations further comprise:

receiving a confirmation message from the second device, the confirmation message confirming receipt, by the second device, of the information about the interference sensitivity; and in response to receiving the confirmation message, stopping the periodic retransmission of the information about the interference sensitivity.

13. The computer-readable storage medium of claim 11, wherein the operations further comprise instructing the second device to adjust an operational aspect of the second device to accommodate the interference sensitivity.

14. A method comprising:
monitoring, by a first device comprising a first processor and a first near-field communications hardware component, a mobility state of the first device;

detecting, by the first device, a change in the mobility state of the first device;

in response to detecting the change in the mobility state of the first device, generating, by the first near-field communications hardware component of the first device, a radio frequency field;

in response to the radio frequency field, activating, by a second device comprising an interference-sensitive component, a second processor, and a second near-field communications component, the second near-field communications component;

providing, to the first device, by the second device, information about an interference sensitivity of the second device, wherein the information about the interference sensitivity comprises a filter selectivity; and adjusting, by the first device, an operational aspect of the first device to accommodate the interference sensitivity of the second device.

15. The method of claim 14, wherein the information about the interference sensitivity further comprises at least one of a device type, a radio type, a receive sensitivity frequency band, a transmit sensitivity frequency band, a receive in-band noise rise limit, a receive in-band receiver overload limit, or a transmit power range.

16. The method of claim 14, wherein adjusting, by the first device, the operational aspect of the first device comprises adjusting a transmit power of the first device.

17. The method of claim 14, wherein adjusting, by the first device, the operational aspect of the first device comprises adjusting a duplexing type utilized by the first device.

18. The method of claim 14, further comprising:
generating, by the first device, a confirmation message to confirm receipt of the information about the interference sensitivity; and sending, by the first device, the confirmation message to the second device.

19. The method of claim 14, wherein the interference-sensitive component comprises a medical device.

20. The method of claim 14, wherein the interference-sensitive component comprises a consumer electronics device.

* * * * *